(12) United States Patent
Haque et al.

(10) Patent No.: US 11,743,048 B2
(45) Date of Patent: *Aug. 29, 2023

(54) METHOD AND APPARATUS FOR SECURE TOKEN GENERATION

(71) Applicant: Comcast Cable Communications, LLC, Philadelphia, PA (US)

(72) Inventors: Asad Haque, Chesterbrook, PA (US); Ahmad Al Tamimi, Malvern, PA (US); Liesheng Long, Havertown, PA (US); Thomas Hughes, III, Harleysville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,172

(22) Filed: Sep. 13, 2021

(65) Prior Publication Data

US 2022/0078016 A1 Mar. 10, 2022

Related U.S. Application Data

(63) Continuation of application No. 16/557,508, filed on Aug. 30, 2019, now Pat. No. 11,146,398.

(51) Int. Cl.
*H04L 9/32* (2006.01)
*H04L 9/40* (2022.01)

(52) U.S. Cl.
CPC .......... *H04L 9/3213* (2013.01); *H04L 9/3247* (2013.01); *H04L 9/3263* (2013.01); *H04L 63/10* (2013.01)

(58) Field of Classification Search
CPC ... H04L 9/3213; H04L 9/3247; H04L 9/3263; H04L 63/10; H04L 9/0825; H04L 9/14;
(Continued)

(56) References Cited

U.S. PATENT DOCUMENTS 7,017,188 B1 * 3/2006 Schmeidler .......... G06F 21/121
707/999.001
9,699,165 B2 7/2017 Okamoto et al.
(Continued)

OTHER PUBLICATIONS

Fernandez et al.; "A Model to Enable Application-scoped Access Control as a Service for IoT Using OAuth 2.0", 2017, IEEE. pp. 322-324 (Year: 2017).*
(Continued)

*Primary Examiner* — Matthew Smithers
(74) *Attorney, Agent, or Firm* — BakerHostetler

(57) ABSTRACT

Methods and apparatuses are described herein for improved communications between a service and end devices via a gateway. A token may be in a signed encrypted state when sent to untrusted devices and may be signed, but not encrypted, when used by trusted devices. Untrusted devices may receive the encrypted token and may use it to access services. An untrusted device may send the received encrypted token to the gateway, which may then send the token to its issuer so that the token issuer may decrypt the data payload. The token may then be sent back to the gateway, which may then read the decrypted data and verify whether the untrusted device is permitted to access the requested service. The gateway may then send, within the trusted domain, the request and token to the service provider so that the untrusted device can obtain access to the requested service.

20 Claims, 8 Drawing Sheets

(58) Field of Classification Search
CPC . H04L 63/0435; H04L 63/0442; H04L 67/02; H04L 63/062; H04L 63/123; H04L 63/0815; H04L 63/0823; H04L 2463/062
See application file for complete search history.

(56) References Cited

U.S. PATENT DOCUMENTS

| | | | |
|---|---|---|---|
| 9,819,648 | B1 | 11/2017 | Chilakapati et al. |
| 11,146,398 | B2 * | 10/2021 | Haque .................. H04L 9/14 |
| 11,503,012 | B1 * | 11/2022 | Yancey ............. H04L 63/0884 |
| 2012/0144195 | A1 | 6/2012 | Nair et al. |
| 2012/0260318 | A1 | 10/2012 | Fromentoux et al. |
| 2012/0311688 | A1 | 12/2012 | Lemus et al. |
| 2013/0091358 | A1 | 4/2013 | Lund et al. |
| 2014/0165209 | A1 | 6/2014 | Yin |
| 2015/0150109 | A1 | 5/2015 | Bocanegra et al. |
| 2017/0195457 | A1 * | 7/2017 | Smith, II ............. H04L 63/166 |
| 2018/0302391 | A1 * | 10/2018 | Jones .................... G06F 16/284 |
| 2019/0372993 | A1 * | 12/2019 | Dunjic ................. H04L 9/3268 |

OTHER PUBLICATIONS

Liu et al.; "Service Token for Identity Access Management", 2009, IEEE, pp. 34-39. (Year: 2009).*
US Patent Application filed on Aug. 30, 2019, entitled "Method and Apparatus for Secure Token Generation", U.S. Appl. No. 16/557,508.

* cited by examiner

METHOD AND APPARATUS FOR SECURE TOKEN GENERATION

CROSS-REFERENCE TO RELATED APPLICATION

This application is a continuation of U.S. patent application Ser. No. 16/557,508, filed Aug. 30, 2019, the entirety of which is incorporated herein by reference.

BACKGROUND

Various computing platforms use access tokens that comprise security credentials for a login session in order to identify a user and the user's privileges, groups, applications, etc. There are many standardized tokens, such as Security Assertion Markup Language (SAML), OpenID, JavaScript Object Notation (JSON) Web Tokens (JWTs), and the like, used in these various computing platforms, but these standardized tokens are associated with various security deficiencies and limitations on their use.

Access tokens created using JWTs are designed to be compact, Uniform Resource Locator (URL) safe, plain text that can be extracted easily. A JWT may be authenticated with a signature (referred to as a JSON Web Signature (JWS)) or encrypted (referred to as a JSON Web Encryption (JWE)). There are known security deficiencies associated with the use of JWTs. For example, in some computing platforms, JWTs are not a feasible choice because they do not provide sufficient security to allow sensitive information to be provided to a client device. A JWS often is not secure enough because it fails to encrypt the data, which as a result may be visible to others. Further, many computing platforms or devices only accept JWSs, which prevents the use of JWEs, but in some applications it may be necessary to encrypt sensitive data. Encrypting sensitive data with a single key involves sharing the same key with all the systems that need to decrypt the token, which greatly reduces the security of the token.

Asymmetric encryption is often also used. However, in systems using asymmetric encryption, key management becomes an issue when the same token is to be consumed by various backend systems because the same token needs to be encrypted with the public keys of the various backend systems, which may be impractical. In these systems, either the entire token is encrypted regardless of its destination or it is signed but not encrypted. When the token is signed and not encrypted, it should not carry any sensitive data. Therefore, if it does have sensitive data, it should only be confined to only trusted systems.

Accordingly, there is a need for a method and apparatus for that overcomes these deficiencies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure Methods and apparatuses are described herein for improved communications between a service and end devices via a gateway. A token and associated functionality are described herein that enable the same token to transition from different states. The token may be in a signed encrypted state when sent to untrusted devices and may be signed, but not encrypted, when used by trusted devices. Untrusted devices may receive the signed encrypted token and may use it to access services. An untrusted device may send the received signed encrypted token to the gateway, which may then send the token to its issuer within the trusted domain so that the token issuer may decrypt the data payload. The token may then be sent back to the gateway, which may then read the decrypted data and verify whether the untrusted device is permitted to access the requested service. The gateway may then send, within the trusted domain, the request and token to the service provider so that the untrusted device can obtain access to the requested service.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION OF ILLUSTRATIVE EMBODIMENTS

Figure 1:
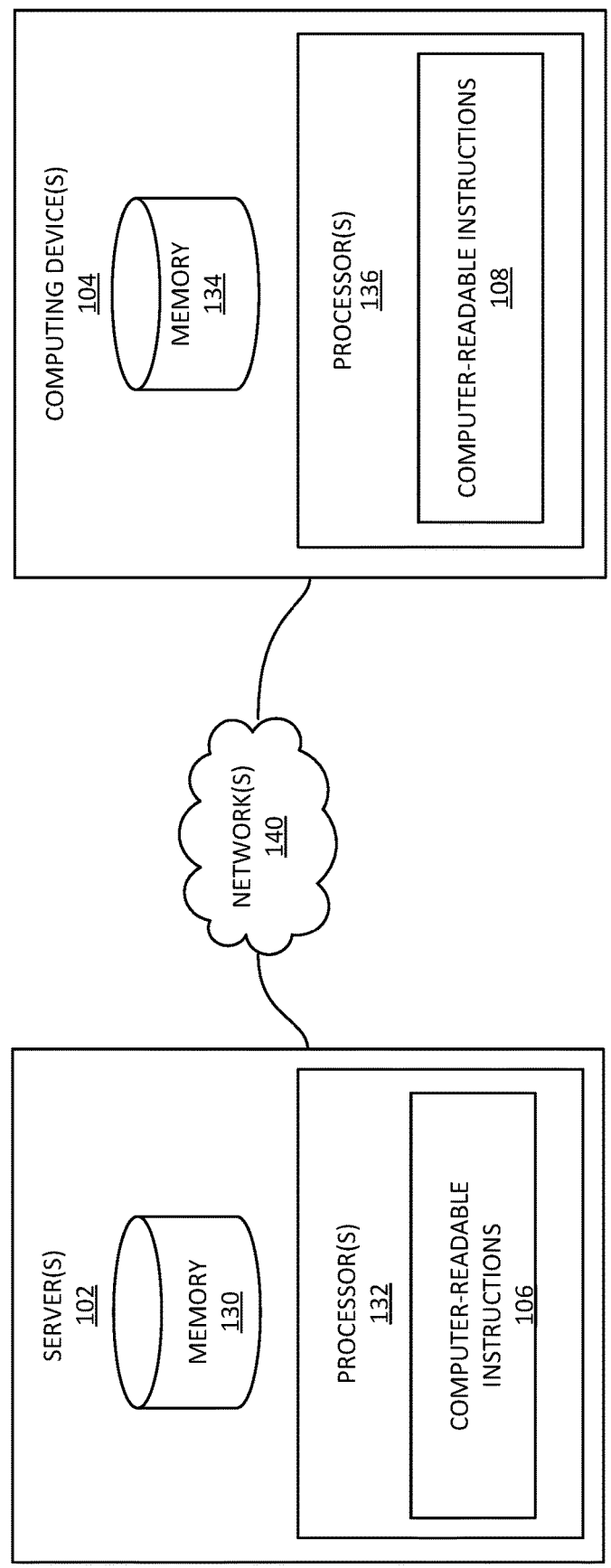
FIG. 1 illustrates a diagram of an example high-level system configured in accordance with one or more embodiments described herein.

Methods and apparatuses are described herein for improved communications between a service and end devices via a gateway. The improved communications may be enabled by a token structure and associated functionality that allows the token to change as it traverses a trust boundary bridged by the gateway. A user may send data, via the gateway, to a third party service provider or cloud platform such that the token is partially understood by the gateway. The gateway may understand the token enough to validate it without decrypting the payload of the token. The gateway may validate the token and determine which entity issued the token so that the token can then be sent to that entity and decrypted.

The token structure and associated functionality described herein may be used by third party services providers and cloud platforms operating in a trusted system to authenticate/process data without exposing sensitive information in an untrusted system. The token structure and associated functionality described herein may enable encryption of data within the token so that it may be sent outside an organization or home within the untrusted system but still hide sensitive application data. The token structure and associated functionality described herein may provide sufficient trust to pass through a gateway but still hide the sensitive data.

An untrusted platform, such as a client application on a customer premises equipment, server, or other computing device, may send a token request over a trust boundary to a token issuer. The token issuer may be associated with the service provider that is providing network access and security to the entities in the trusted system. The client application may comprise, for example, an Internet of Things (IoT) platform or other mobile application. The token issuer may generate a token, encrypt sensitive data within the token body, and sign the token using a signature. The token issuer may send the signed encrypted token to the untrusted platform over the trust boundary. The signed encrypted token may comprise an encrypted key in its header, the encrypted data payload in its body, and the signature in a signature portion. The token may have an associated time for validity. The data payload in the token is encrypted so that the untrusted platform or other parties within the untrusted domain are not able to determine the content of the information. The signature of the token is not encrypted. The header of the token may contain a Uniform Resource Locator (URL) to a signature validation key.

The untrusted platform may use the signed encrypted token to access a service provided by a third party service provider or cloud platform over the trust boundary. A gateway may receive the token and validate the token signature. If the signature is valid, the gateway may send the token comprising the encrypted data to the token issuer so that the encrypted data can be decrypted by the token issuer. Because the contents of the token are partially encrypted, and the token is signed (and the gateway is able to validate the unencrypted signature), the gateway is able to process the token.

The token issuer may then decrypt the key in the header using its private key. Using the decrypted key, the token issuer may decrypt the sensitive data in the data payload. The token issuer may then sign the token with decrypted sensitive data and may send the decrypted token to the gateway.

Within the trusted domain beyond the trust boundary, the gateway may receive the decrypted token and read the decrypted data. The gateway may then verify, based on the decrypted data, whether the untrusted platform has sufficient permissions to access the requested service provided by the third party service provider or cloud platform. The gateway may invoke an application program interface (API) associated with the requested service.

As a result of this technique, decryption is offloaded to the token issuer (e.g., a trusted entity within the trusted domain), and the gateway and the third party service provider or cloud platform are not able to decrypt the token and do not have the key. Based on the invoked API, the third party service provider or cloud platform may be able to process the request once the token is decrypted by the token issuer (e.g., a request for data, video, service, etc.) and only needs to validate the signature in the token. Further, only the token issuer needs to have the key to decrypt the sensitive data in the token thereby improving the efficiency of key management.

The structure of the signed encrypted token may, for example, be referred to herein as a JavaScript Object Notation (JSON) Web Encrypted Signed (JWES) token structure. This structure may comprise a modified JSON Web Token (JWT) structure comprising partial encryption. The structure of the token may also be backwards compatible with the structure of a JSON Web Signature (JWS)) because the signature of the token is not encrypted. A JWES structure may enable a device such as a gateway to accept the token because of the token's compatibility with the structure of a JWS. The structure of the token may enable the gateway to validate the token signature by retrieving the validation key in the header.

FIG. 1 illustrates a diagram of an example high-level system 100 configured in accordance with one or more embodiments described herein. In the example of FIG. 1, the system 100 may include one or more computing device(s) 104. Computing device(s) 104 may be configured to communicate with one or more server(s) 102. Computing device(s) 104 may be configured to communicate with other computing devices via server(s) 102 and/or according to a peer-to-peer architecture and/or other architectures. Users may access system 100 via computing device(s) 104.

Server(s) 102 and/or computing device(s) 104 may include transmitters, receivers, and/or transceivers enabling the server(s) 102, and/or computing device(s) 104 to be operatively linked via one or more electronic communication links. For example, such electronic communication links may be established, at least in part, via a network 140 such as the Internet and/or other networks. The electronic communication links may enable wired or wireless communications among the server(s) 102 and/or computing device(s) 104 using technologies such as coaxial cable, Ethernet, fiber optics, microwave, satellite, Public Switched Telephone Network (PTSN), DSL (Digital Subscriber Line), Broadband over Power Lines (BPL), wireless local area network (WLAN) technology such as Institute of Electrical and Electronics Engineers (IEEE) 802.11 technology, wireless cellular technology, Bluetooth, or any other appropriate technologies. It will be appreciated that the example system 100 of FIG. 1 is not intended to be limiting, and that the scope of this disclosure includes implementations in which server(s) 102 and/or computing device(s) 104 may be operatively linked via some other communication media.

Server(s) 102 may be configured by computer-readable instructions 106. Computer-readable instructions may include one or more instruction modules. The instruction modules may include computer program modules. Processor(s) 132 may be configured to execute the computer-readable instructions 106, and perform the procedures in accordance with the embodiments described herein. By way of non-limiting example, the server 102 may include any system that is programmed to transmit or access content consistent with the description herein, and may be, for example, a video/audio server, a content delivery network (CDN), a cable head end, or any other suitable system or other computing platform. Server(s) 102 include a memory 130, and one or more processors 132, and/or other components. Server(s) 102 may include communication interfaces, lines, or ports to enable the exchange of information with network 140 and/or other computing platforms. The illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. The memory 130 may comprise non-transitory storage media that electronically stores information, such as, for example, the computer-readable instructions 106. Processor(s) 132 may be configured to provide information processing capabilities in server(s) 102.

Computing device(s) 104 in accordance with the various embodiments described herein may include a memory 134, and one or more processors 136, and/or other components. Computing device(s) 104 may be configured by computer-readable instructions 108. Computer-readable instructions 108 may include one or more instruction modules. The instruction modules may include computer program modules. The instruction modules may include code that calls application programming interfaces (APIs) associated with a plurality of other applications and computing platforms. Processor(s) 136 may be configured to execute the computer-readable instructions 108, respectively and perform the procedures in accordance with the embodiments described herein. By way of non-limiting example, the computing device 104 may include one or more of a set-top box, a wireless gateway, a desktop computer, a laptop computer, a handheld computer, a tablet computing platform, a netbook, a smartphone, a gaming console, and/or other computing platforms. Computing device(s) 104 may include communication interfaces, lines, or ports to enable the exchange of information with network 140 and/or other computing platforms. The illustration of computing device(s) 104 in FIG. 1 is not intended to be limiting. Computing device(s) 104 may include a plurality of hardware, software, and/or firmware components operating together to provide the functionality attributed herein to computing device(s) 104. For example, computing device(s) 104 may be implemented by a cloud of computing platforms operating together as computing device(s) 104. The memory 134 may comprise non-transitory storage media that electronically stores information, such as, for example, the computer-readable instructions 108. Processor(s) 136 may be configured to provide information processing capabilities in computing device(s) 104.

Figure 2:
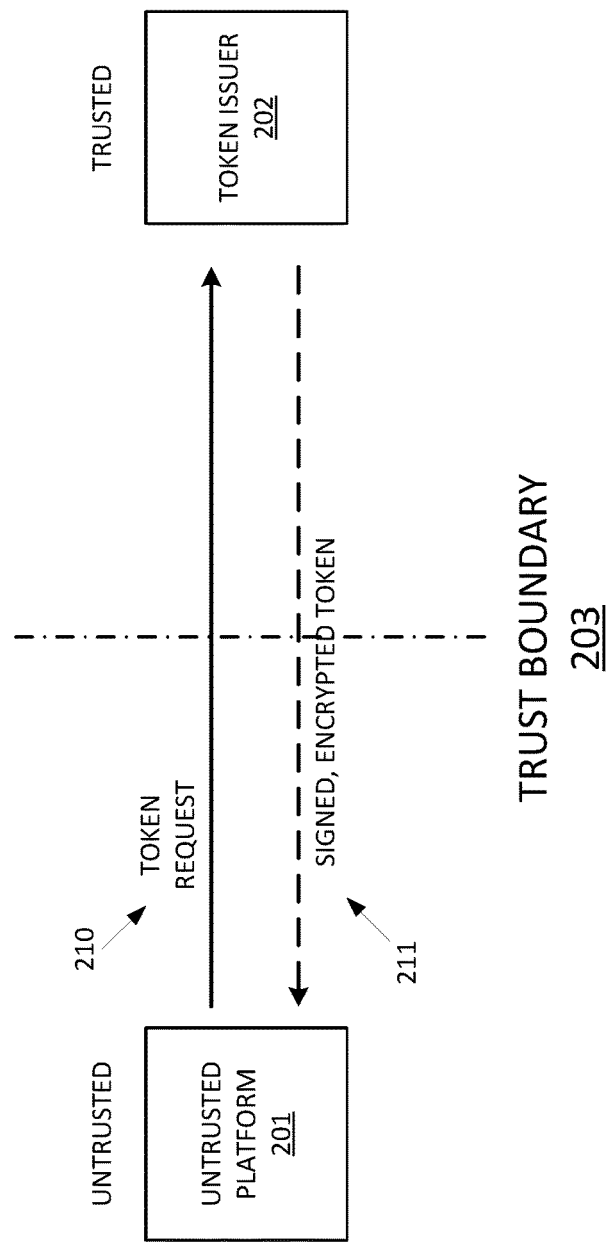
FIG. 2 is a diagram of an example system configured in accordance with one or more embodiments described herein.

FIG. 2 is a diagram of an example system 200 configured for secure token generation, in accordance with one embodiment, which may be used in combination with any of the embodiments described herein. In the example system of FIG. 2, an untrusted platform 210 may send a token request 210 over a trust boundary 203. The untrusted platform 201 may comprise an application on a customer premises equipment, server, or other computing device. For example, the customer premises equipment, server, or computing device may comprise the computing device 104 of FIG. 1. The application may comprise, for example, an IoT platform or other mobile application. The token issuer 202 may comprise, for example, a service provider. The service provider may be providing security and network access to the untrusted platform 201.

The token issuer 202 may generate a key and then may encrypt sensitive data in a token using the key. The sensitive data may comprise information associated with the untrusted platform 201. The information associated with the untrusted platform 201 may comprise information indicating at least one of permissions of the untrusted platform 201, account information of the untrusted platform 201, or capabilities of the untrusted platform 201. The key may comprise a random content encryption key (CEK). The token issuer 202 may then encrypt the key with its public key to produce an encrypted content encryption key (eCEK). The token issuer 202 may then add the eCEK to a token header and may add the encrypted sensitive data payload to the token body. The encrypted sensitive data in the body may be referred to herein as a claim set.

The token issuer 202 may then sign the token with its private key and may add the signature to the signature portion of the token. The signature of the token 211 is not be encrypted. The header of the token 211 may comprise a URL to a signature validation key. The URL may, for example, provide a link to an x509 public key certificate (e.g., in the x5u property). The token 211 may have an associated time for validity, which may, for example, be indicated by a timestamp.

The token issuer 202 may then send, to the untrusted platform 201 over the trust boundary 203, the signed token 211 comprising the encrypted data and the header comprising the eCEK.

Using this technique, the structure of the token 211 may comprise a modified JWT that is partially encrypted (e.g. the data payload is encrypted) in order to maintain backward compatibility with a JWE. The structure of the token 211 may also be backwards compatible with the structure of a JWS because the signature of the token is not encrypted. This modified JWT structure of token 211 may be referred to a JWES token.

The structure of the token 211 may, for example, enable an API gateway to accept the token 211. In an example, the API gateway may be able to accept the token 211 because it is JWS compatible, while allowing the API gateway to validate the token signature by retrieving the x509 certificate specified in the URL of the x5u property in the header.

Figure 3:
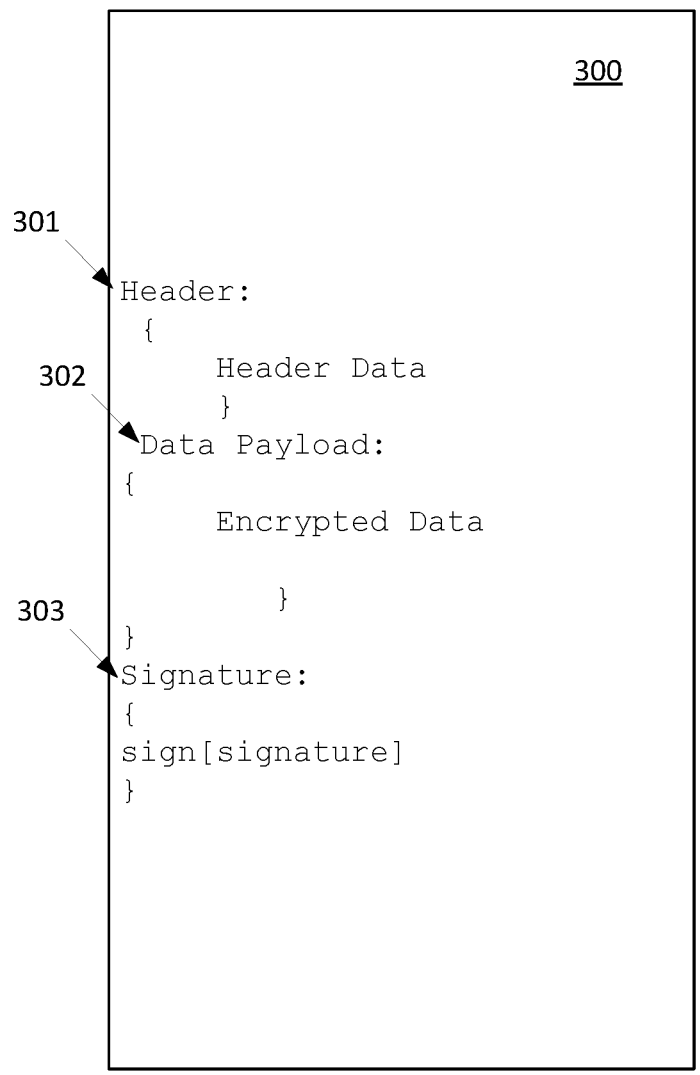
FIG. 3 is a diagram of an example token structure in accordance with one or more embodiments described herein.

FIG. 3 is a diagram of an example token 300, in accordance with one embodiment, which may be used in combination with any of the embodiments described herein. The token 300 may be generated using the system 200 of FIG. 2. The token 300 may comprise a header 301 comprising an encrypted key, the encrypted data payload 302 in its body, and the signature in a signature portion 303. When an untrusted platform receives the token 300, the token 200 may appear as in the below example:

```
Header:
{
    "alg" : "RS512",
    "typ" : "JWT",
    "ecek": "XH7DAHVCAOCN",
    "ealg": "A128GCMKW",
    "enc": "AES128GCM",
    "kid" : "x509_cert_1",
    "x5u" : "https://dhp-auth-
    service.domain.com/keys/x509_cert_1",
}
Data Payload:
{
    ...
    "capabilities":[
        "GS8IHNKOJNeQvRTWJjTUW157RGnFLinL3fSWvV1HgoQULjjMy",
        "GS8IHNKOJNeQvRTWJjTUWj10Ash1GRa8NwEPRcL04W0RWZIwP",
        "73MtzRHPr4xf3piS1wVDTMkd9AhPudQrRTjEq2sZYX0f7GoBnV"
    ],
```

```
    "allowedResources": {
        "allowedPartners": ["G/f32SPV8OZ47eqfmeycTw=="] ,
        "allowedServiceAccountIds":"+4UK3wu/pk1z6DXYcE22+Q=="]
    ,
    }
}
Sign:
{
sign [signature]
}
```

The token 300 above may comprise other header properties. These header properties may be added to assist in the encryption process. The header properties may include but are not limited to:

eCEK/CEK: The ECEK may comprise a BASE64URL of an encrypted CEK. The CEK may be encrypted with the public key of the untrusted platform using the RSA or ECDS algorithm to produce the JWE Encrypted Key. The CEK may be used to encrypt the capabilities and allowed resources of the token 300.

EALG: The cryptographic algorithm used to encrypt or determine the CEK (for eCEK)

ENC: Content encryption algorithm used to encrypt the private claim sets.

Figure 4:
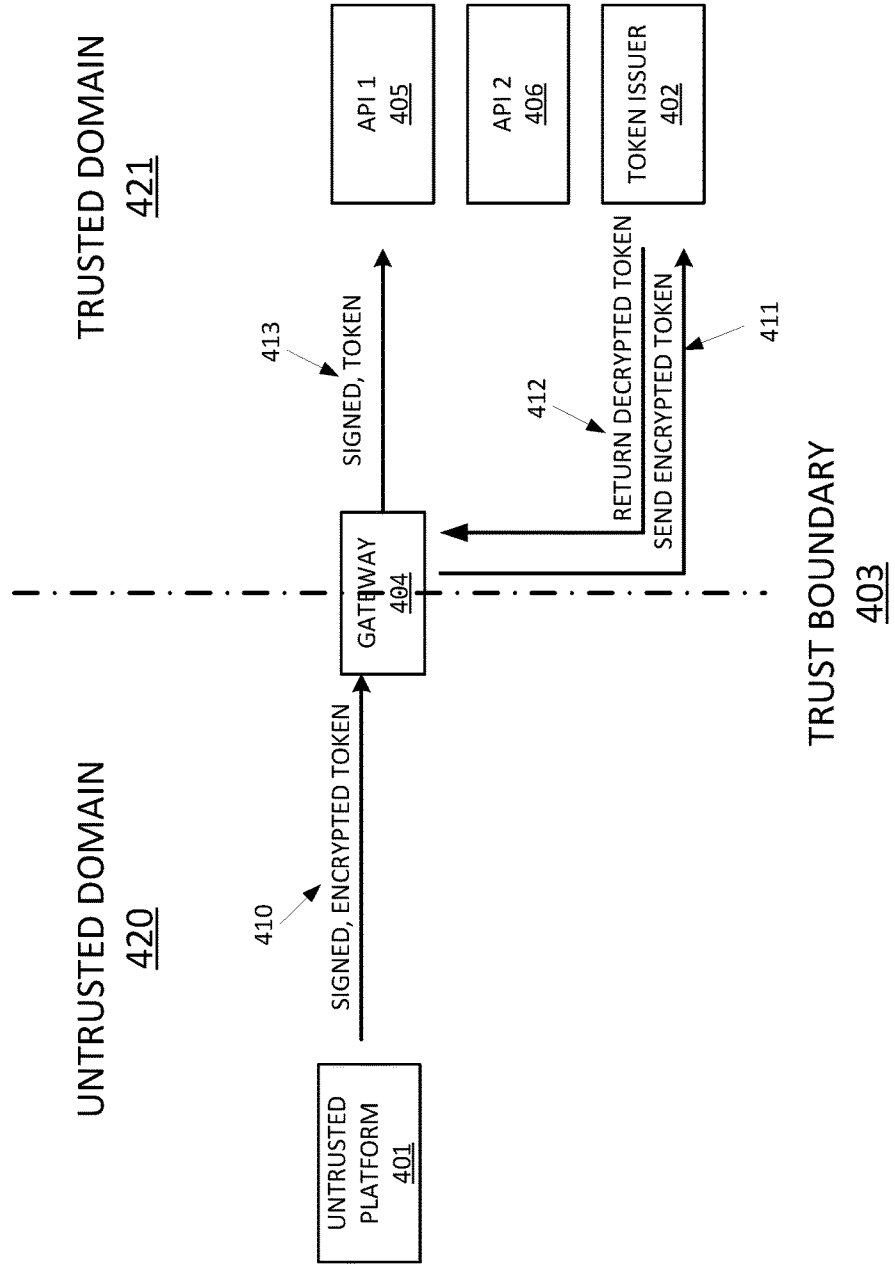
FIG. 4 is a diagram of an example system configured in accordance with one or more embodiments described herein.

FIG. 4 is a diagram of an example system 400 configured for using a secure token, in accordance with one embodiment, which may be used in combination with any of the embodiments described herein. In the example system 400, an untrusted platform 401 may be communicating in an untrusted domain 420, via a gateway 404, with entities in a trusted domain 421. The untrusted platform 401 may comprise an application on a customer premises equipment, server, or other computing device. For example, the customer premises equipment, server, or computing device may comprise the computing device 104 of FIG. 1. The application may comprise, for example, an IoT platform or other mobile application.

The entities in the trusted domain 421 may comprise a token issuer 402, API 1 405, and API 2 406. The token issuer 402 may comprise, for example, a service provider. The service provider may be providing security and network access to the untrusted platform 401. The service provider may have provided the gateway 404 to the untrusted platform 401 in order to provide the network access. The gateway 404 may be configured to bridge a trust boundary 403. The gateway 404 may comprise a network interface to the untrusted domain 420 and a network interface to the trusted domain 421. The gateway 404 may execute software that manages the network interfaces and controls access to the trust domain 421 by untrusted devices operating in the untrusted domain 420.

The service provider associated with the token issuer 402 may also be providing security and network access in the trusted domain 421 to third party service providers or cloud platforms that provide various services to user devices (e.g., the untrusted platform 401).

The untrusted platform 401 may send a request 410 to access a service provided by a third party service or cloud platform over the trust boundary 403. API 1 405 or API 2 406 may be associated with the service provided by the third party service or cloud platform. The service may comprise, for example, access to video content hosted by a server of the third party service or cloud platform. The request 410 may comprise a token such as the token 211 issued in the example of FIG. 2. The token may comprise the structure of the token 300 in the example of FIG. 3, which comprises encrypted sensitive data in the data payload portion. The sensitive data is encrypted so that entities in the untrusted domain 420 cannot intercept and interpret the sensitive data in the token.

The gateway 404 may receive the token and validate the token signature. If the token signature is valid, the gateway 404 may then identify the issuer of the token and then may send the token 411 to the token issuer 402. The gateway 404 cannot read the sensitive data in the encrypted data payload because it does not have the key needed to decrypt the sensitive data. However, because the token is signed, the gateway 404 is able to process the token, determine the issuer of the token, and send the token to the token issuer 402 in order to have the sensitive data decrypted.

After receiving the token, the token issuer 402 may decrypt the eCEK in the header of the token using its private key to retrieve a CEK. Using the CEK, the token issuer 402 may decrypt the sensitive data in the payload of the token. The token issuer 402 may then sign the decrypted token and may return the signed decrypted token 412 to the gateway 404.

Within the trusted domain 421 beyond the trust boundary 403, the gateway 404 is then able to read and process the decrypted data. By processing the decrypted data, the gateway may then determine information associated with the untrusted platform 401, which may indicate at least one of permissions of the untrusted platform 401, account information of the untrusted platform 401, or capabilities of the untrusted platform 401. The gateway 404 may then determine whether the untrusted platform 401 is permitted to access the service provided by the third party service or cloud platform. Determining whether the untrusted platform 401 is permitted to access the service provided by the third party service or cloud platform may comprise interpreting the decrypted data to verify the permissions, account information, or capabilities of the untrusted platform 401.

The gateway 404 may then replace the encrypted signed token with the signed decrypted token and may invoke API 1 405 or API 2 406 as requested 413 by the untrusted platform to access the service provided by the third party service or cloud platform.

The decrypted signed token may appear as in the below example:

```
{
...
"capabilities": [
"x1:dhp:mediaBlob:feature:api:image#upload" ,
"x1:dhp:mediaBlob:data:comcast:image#read",
"x1:dhp:deviceService:device:cameratreboot" ] ,
    "allowedResources": {
        "allowedPartners": ["Company 1"],
```

```
            "allowedServiceAccountIds": "1234567890"],
    }
}
```

As a result of the system 400 of FIG. 4, decryption is offloaded to the token issuer 402 (e.g. a trusted entity within the trusted domain). The third party service or cloud platform, associated with API 1 405 or API 2 406, are not able to decrypt the token because they do not have the key used to retrieve the CEK or decrypt the sensitive data (the token issuer 402 has the key). However, API 1 405 and API 2 406 may process the request 413 (e.g., a request for data, video, etc.) because they are able to validate the signature in the decrypted signed token and process the decrypted data. This technique improves security while reducing the number of keys that need to be distributed in the system 400 and therefore improves the efficiency of key management.

Figure 5:
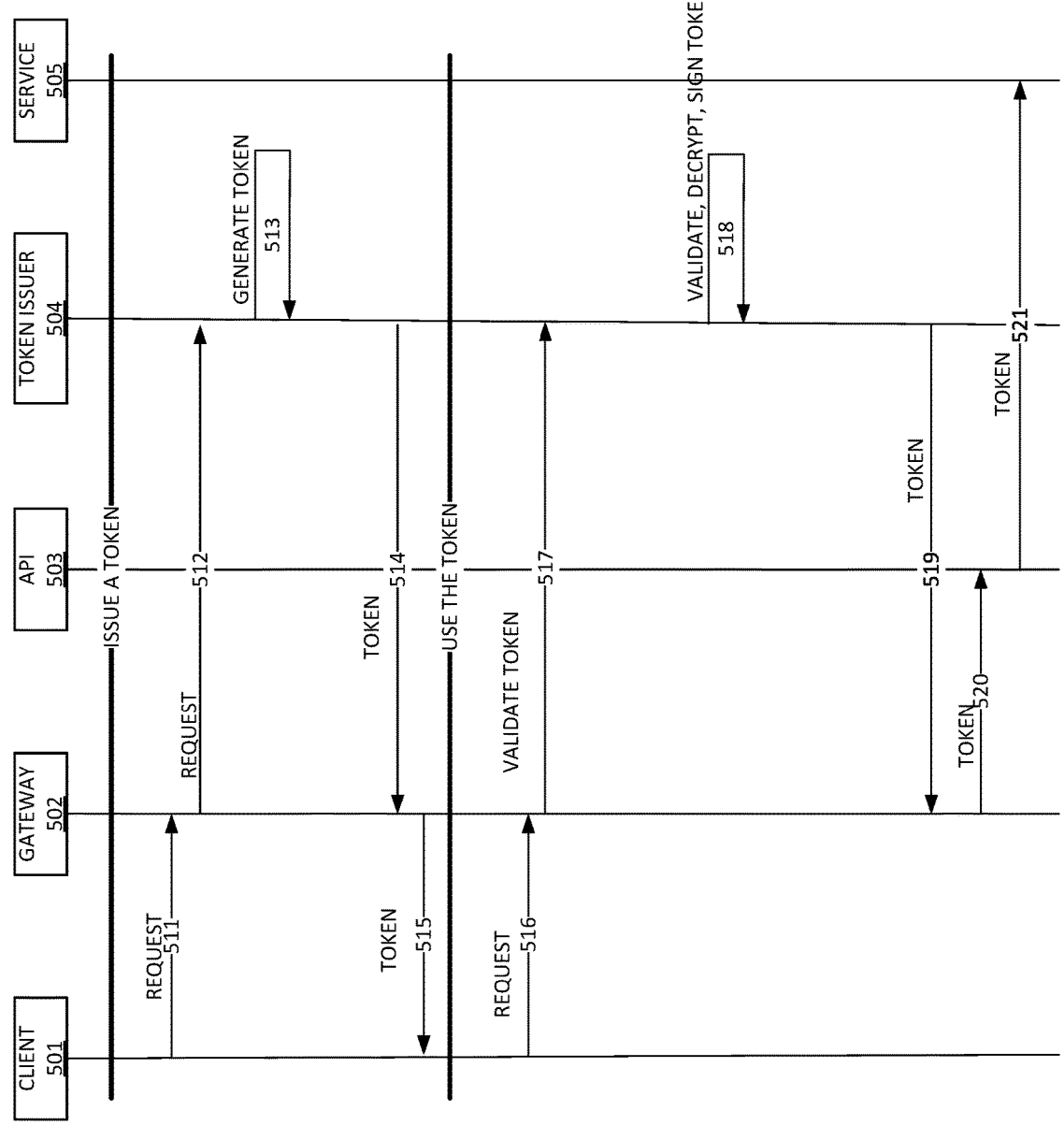
FIG. 5 is an example method.

FIG. 5 is diagram of an example procedure 500 configured for token encryption and decryption in accordance with one embodiment, which may be used in combination with any of the embodiments described herein. In the example of FIG. 5, an encrypted service access token (eSAT) comprising a JWT with encrypted sensitive data, e.g. a token with a JWES structure as described herein, may be issued as described in the following example steps.

The client 501 may send a token request via gateway 502 (step 511), which may send the request to token issuer 504 (step 512). Token issuer 504 may process the token request and generate a token (e.g., an eSAT token) (step 513) by encrypting the data payload using a CEK, which is then encrypted to create an eCEK. The token may comprise a JWES structure. The token issuer 504 may add the eCEK to the header of the token comprising the encrypted data and may sign the token. The token issuer 504 may then send the token to gateway 502 (step 514), which may send the token to the client 501 (step 515).

The token in the example of FIG. 5 may then be used as described in the following example steps. The client 501 may send a request for a service from a third party service provider to API 503 which may be intercepted by gateway 502 (step 516). The gateway 502 may send a request to the issuer 504 to validate the token (step 517). The token issuer 504 may validate the signature and time to live (TTL), decrypt the key (e.g., a symmetric key) using the private key of token issuer 504 (step 519), decrypt the data payload using the decrypted key (step 520), and sign the token with the private key of the token issuer 504 (step 518). The token issuer 504 may send the decrypted token to gateway 502 (step 519), which may send the token to the API 503 (step 520). The API 503 may then send the token to service 505 (step 521) to obtain the requested third party service.

Figure 6:
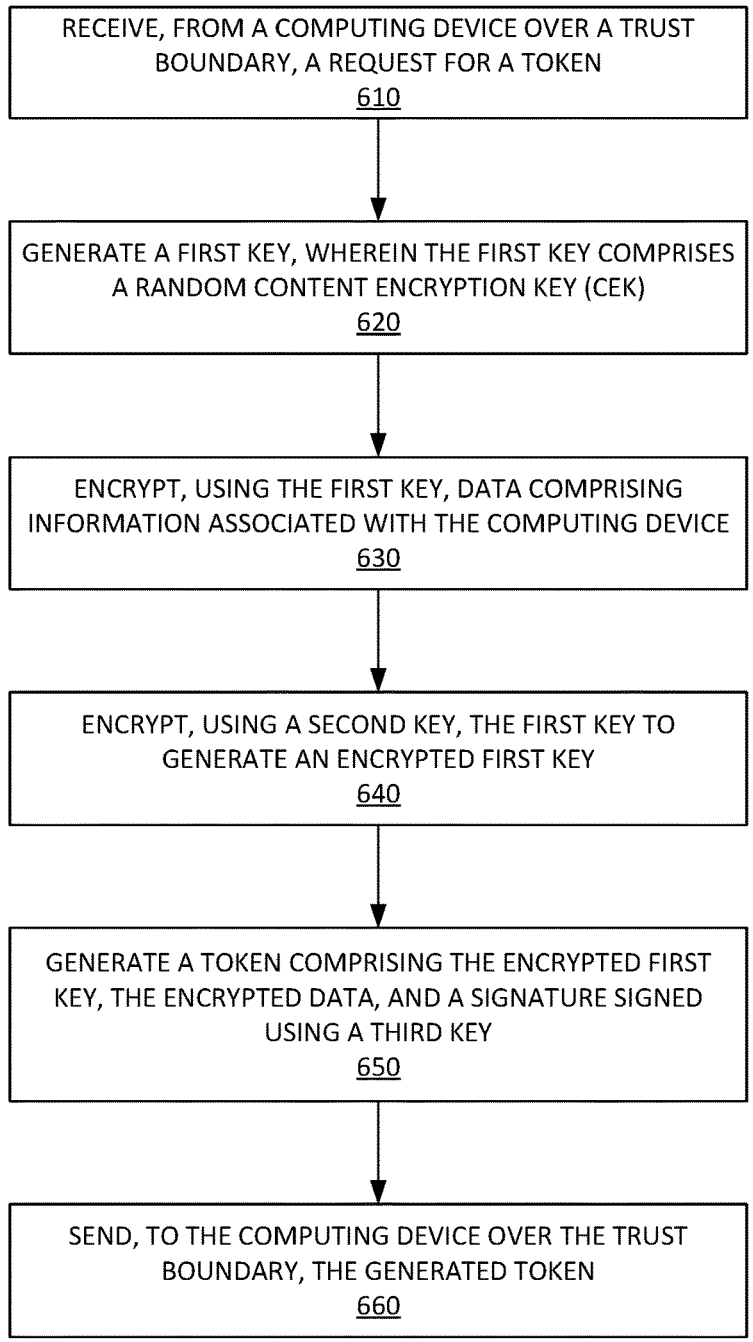
FIG. 6 is an example method.

FIG. 6 is a flow diagram of an example method 600 for generating a secure token, in accordance with one embodiment, which may be used in combination with any of the embodiments described herein. In the example of FIG. 6 a computing device, as described herein, may implement the procedure 600. The computing device implementing the procedure may be associated with a service provider that generates tokens and may be providing security and network access to untrusted devices and to third party service providers or cloud platforms in a trusted domain that provide various services to the untrusted user devices. While each step of the procedure 600 in FIG. 6 is shown and described separately, multiple steps may be executed in a different order than what is shown, in parallel with each other, or concurrently with each other. The computing device may have a memory that has stored thereon computer-readable instructions that, when executed, cause the computing device to perform steps as described. In some examples, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At step 610, a request for a token may be received from a computing device over a trust boundary. The computing device may be communicating in an untrusted system. At step 620, a first key, wherein the first key comprises a random content encryption key (CEK), may be generated.

At step 630, data comprising information associated with the computing device may be encrypted using the first key. The information may indicate at least one of: permissions of the first computing device, account information of the first computing device, or capabilities of the first computing device.

At step 640, the first key to generate an encrypted first key may be encrypted using a second key. At step 650, a token comprising the encrypted first key, the encrypted data, and a signature signed using a third key may be generated. At step 660, the generated token may be sent to the computing device over the trust boundary. The token may further comprise a Uniform Resource Locator (URL) providing a link to a public key certificate associated with the signature.

Figure 7:
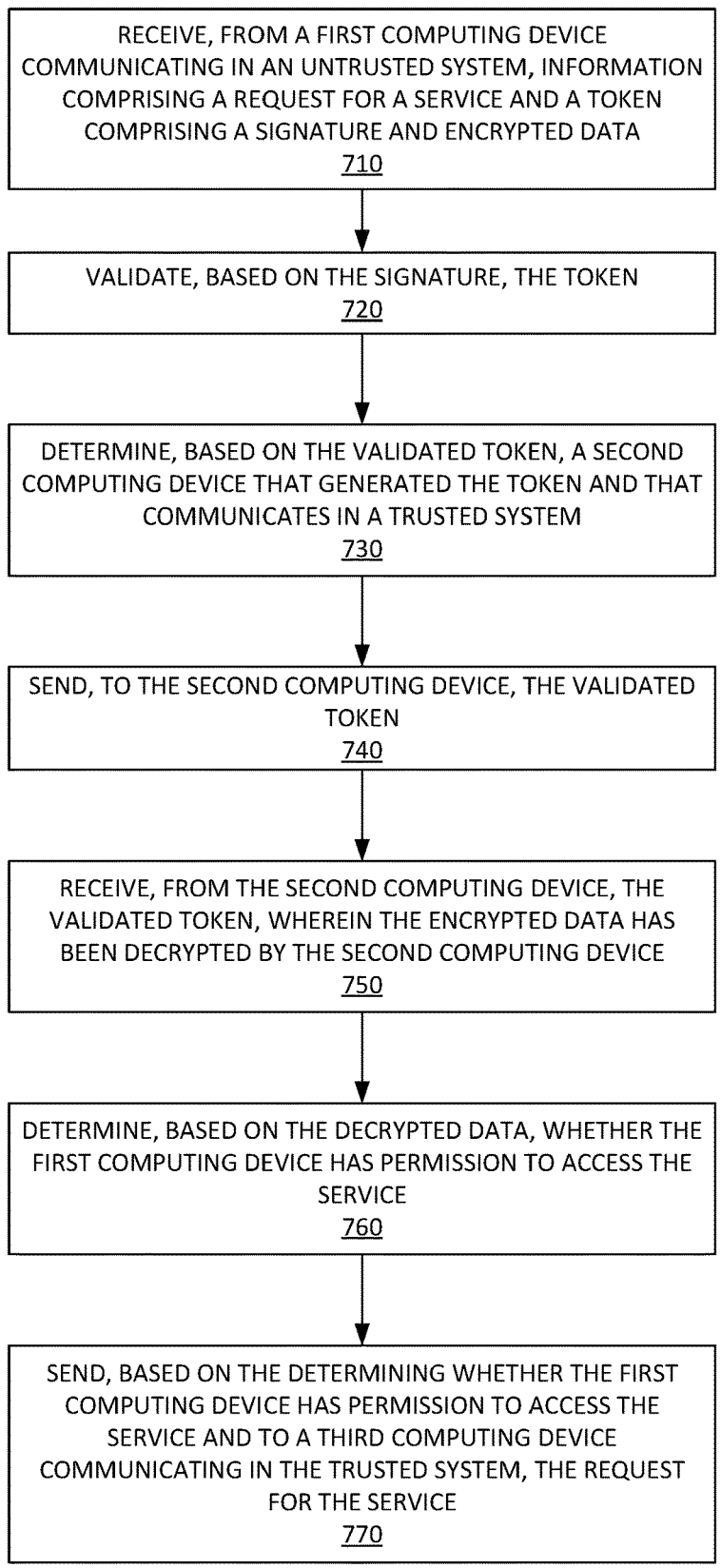
FIG. 7 is an example method.

FIG. 7 is a flow diagram of an example method 700 for using a secure token, in accordance with one embodiment, which may be used in combination with any of the embodiments described herein. In the example of FIG. 7 a computing device, as described herein, such as a gateway may implement the procedure 700. While each step of the procedure 700 in FIG. 7 is shown and described separately, multiple steps may be executed in a different order than what is shown, in parallel with each other, or concurrently with each other. The computing device may have a memory that has stored thereon computer-readable instructions that, when executed, cause the computing device to perform steps as described. In some examples, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At step 710, a gateway (or any other computing device described herein) may receive, from a first computing device communicating in an untrusted system, information comprising a request for a service and a token comprising a signature and encrypted data. The gateway may comprise an interface to the untrusted system. The first computing device may be running an application that may comprise an IoT or mobile application. The encrypted data may have been encrypted using a first key (e.g., a random content encryption key (CEK)) that was encrypted using a second key to generate an encrypted first key (e.g., an encrypted content encryption key (eCEK)). The token may further comprise a header comprising the encrypted first key. The encrypted data may comprise information indicating at least one of permissions of the first computing device, account information of the first computing device, or capabilities of the first computing device At step 720, the gateway may validate, based on the signature, the token. The token may further comprise a Uniform Resource Locator (URL) providing a link to a public key certificate associated with the signature to enable the gateway to validate the token.

At step 730, the gateway may determine, based on the validated token, a second computing device that generated the token and that communicates in a trusted system. The second computing device may be operating in the trusted domain beyond a trust boundary. The second computing device may be associated with a service provider providing network access and security to the first computing device.

At step 740, the gateway may send, to the second computing device, the validated token. At step 750, the gateway may receive, from the second computing device, the validated token, wherein the encrypted data has been decrypted by the second computing device. At step 760, the gateway may determine, based on the decrypted data, whether the first computing device has permission to access the service.

At step 770, the gateway may send, based on the determining whether the first computing device has permission to access the service and to a third computing device communicating in the trusted system, the request for the service. The third computing device may be associated with a third party service or cloud platform. The second computing device may be providing network access and security to the first computing device.

Figure 8:
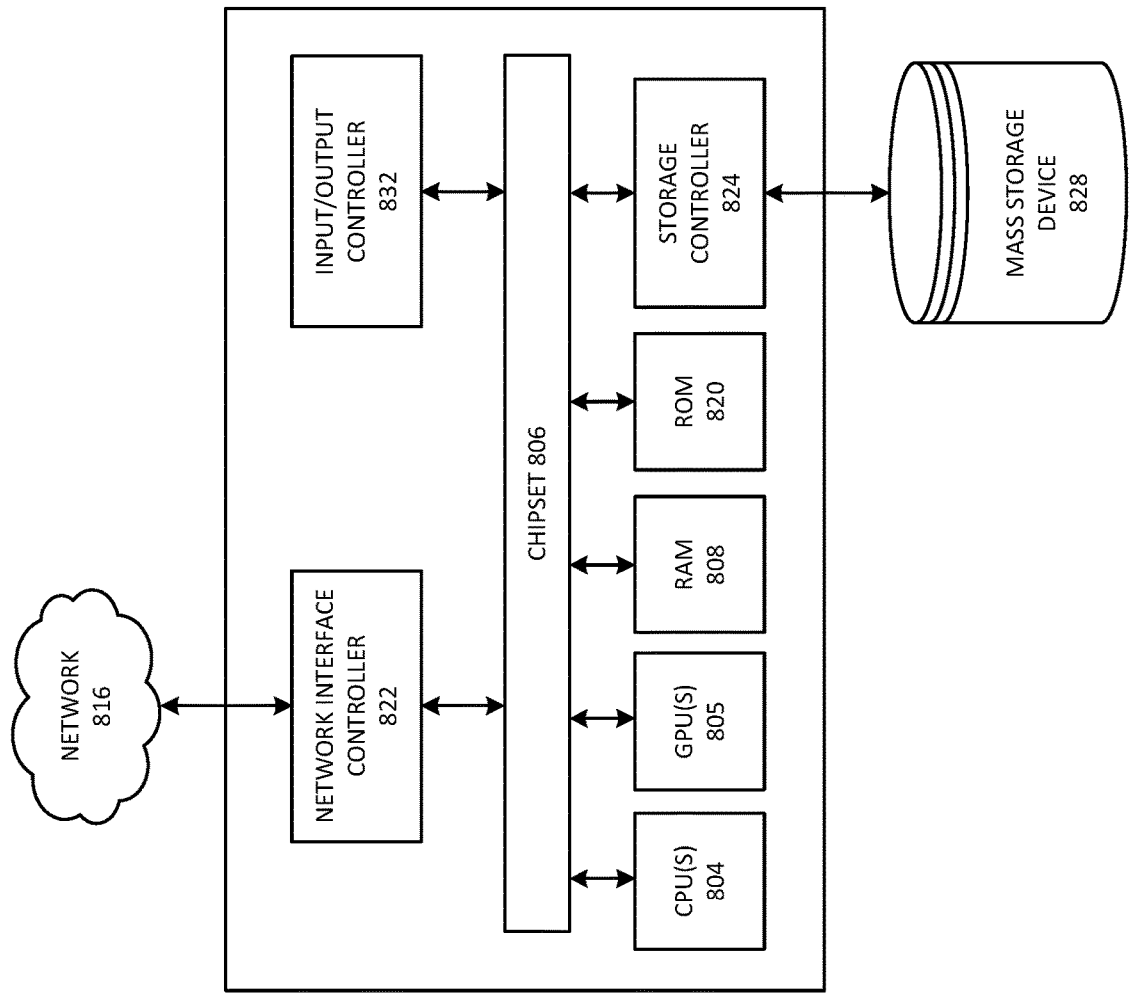
FIG. 8 depicts an example computing device that may be used in various aspects, such as the servers, modules, and/or devices described herein.

FIG. 8 depicts a computing device 800 that may be used in various aspects, such as the servers, modules, devices, or methods depicted in FIGS. 1-7. With regard to the example architectures of FIGS. 1-5, the devices may each be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 6-7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIGS. 6-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
    receiving, from a first computing device communicating in an untrusted system, information comprising:
        a request for a service; and
        a token comprising a signature and encrypted data;
    sending, to a second computing device that generated the token and that communicates in a trusted system, the token;
    receiving, from the second computing device and based on the encrypted data, decrypted data indicating that the first computing device has permission to access the service; and
    sending, to a third computing device communicating in the trusted system and based on a determination that the first computing device has permission to access the service, the request for the service.

2. The method of claim 1, wherein the second computing device is associated with a service provider providing network access and security to the first computing device and the third computing device.

3. The method of claim 1, wherein the third computing device is associated with a third party service or cloud platform.

4. The method of claim 1, wherein the encrypted data was encrypted using a first key, and wherein the first key is encrypted using a second key to generate an encrypted first key.

5. The method of claim 4, wherein the token further comprises a header comprising the encrypted first key.

6. The method of claim 4, wherein the first key is a random content encryption key (CEK).

7. The method of claim 4, wherein the encrypted first key comprises an encrypted content encryption key (eCEK).

8. The method of claim 4, wherein the second key is a public key.

9. The method of claim 4, wherein the token further comprises a Uniform Resource Locator (URL) providing a link to a public key certificate associated with the signature.

10. The method of claim 1, wherein the encrypted data comprises information indicating at least one of:
    permissions of the first computing device,
    account information of the first computing device, or
    capabilities of the first computing device.

11. A method comprising:
    receiving, from a first computing device communicating in an untrusted system, information comprising:
        a request for sensitive data; and
        a token comprising a signature and encrypted data;
    sending, to a second computing device that generated the token and that communicates in a trusted system, the token;
    receiving, from the second computing device and based on the encrypted data, decrypted data indicating that the first computing device has permission to access the sensitive data; and
    sending, to a third computing device communicating in the trusted system and based on a determination that the first computing device has permission to access the sensitive data, the request for sensitive data.

12. The method of claim 11, wherein the second computing device is associated with a service provider providing network access and security to the first computing device and the third computing device.

13. The method of claim 11, wherein the third computing device is associated with a third party service or cloud platform.

14. The method of claim 11, wherein the encrypted data was encrypted using a first key, and wherein the first key is encrypted using a second key to generate an encrypted first key.

15. The method of claim 14, wherein the token further comprises a header comprising the encrypted first key.

16. The method of claim 11, wherein the encrypted data comprises information indicating at least one of:
    permissions of the first computing device,
    account information of the first computing device, or
    capabilities of the first computing device.

17. A method comprising:
    receiving, by a first computing device communicating in a trusted system and based on a request for a service from a second computing device communicating in an untrusted system, a token comprising a signature and encrypted data;
    determining, by the first computing device and based on the encrypted data, that the second computing device has permission to access the service; and
    sending, by the first computing device, decrypted data indicating that the second computing device has permission to access the service to cause sending, to a third computing device communicating in the trusted system, the request for the service.

18. The method of claim 17, wherein the first computing device is associated with a service provider providing network access and security to the second computing device and the third computing device.

19. The method of claim 17, wherein the third computing device is associated with a third party service or cloud platform.

20. The method of claim 17, wherein the encrypted data was encrypted using a first key, and wherein the first key is encrypted using a second key to generate an encrypted first key.

* * * * *